Figure 1:
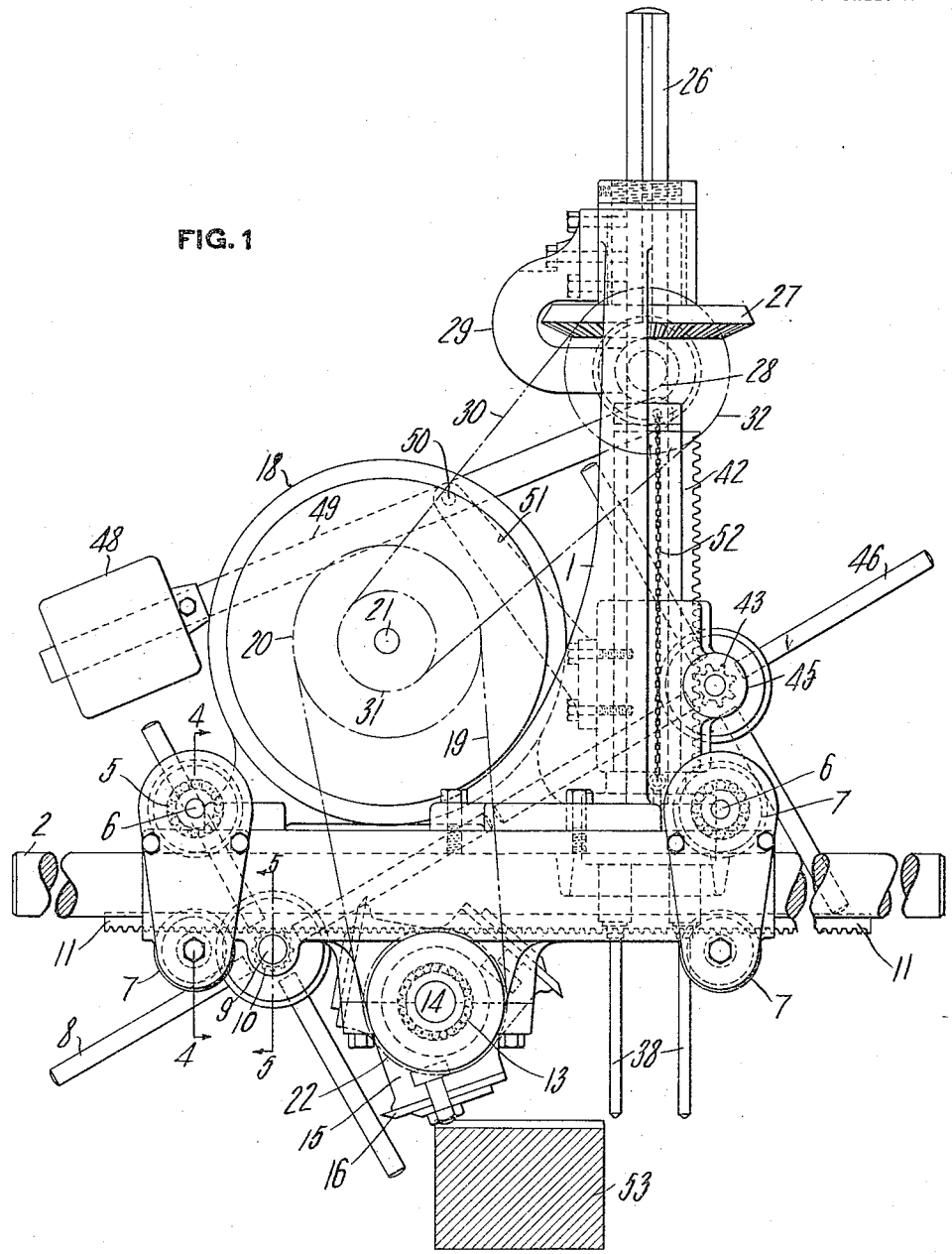

G. B. SHIPLEY.
ADZING AND BORING MACHINE.
APPLICATION FILED JUNE 27, 1914.

1,161,986.

Patented Nov. 30, 1915.
3 SHEETS—SHEET 1.

WITNESSES

INVENTOR
Grant B. Shipley,
By Fredk W. Winter
Attorney

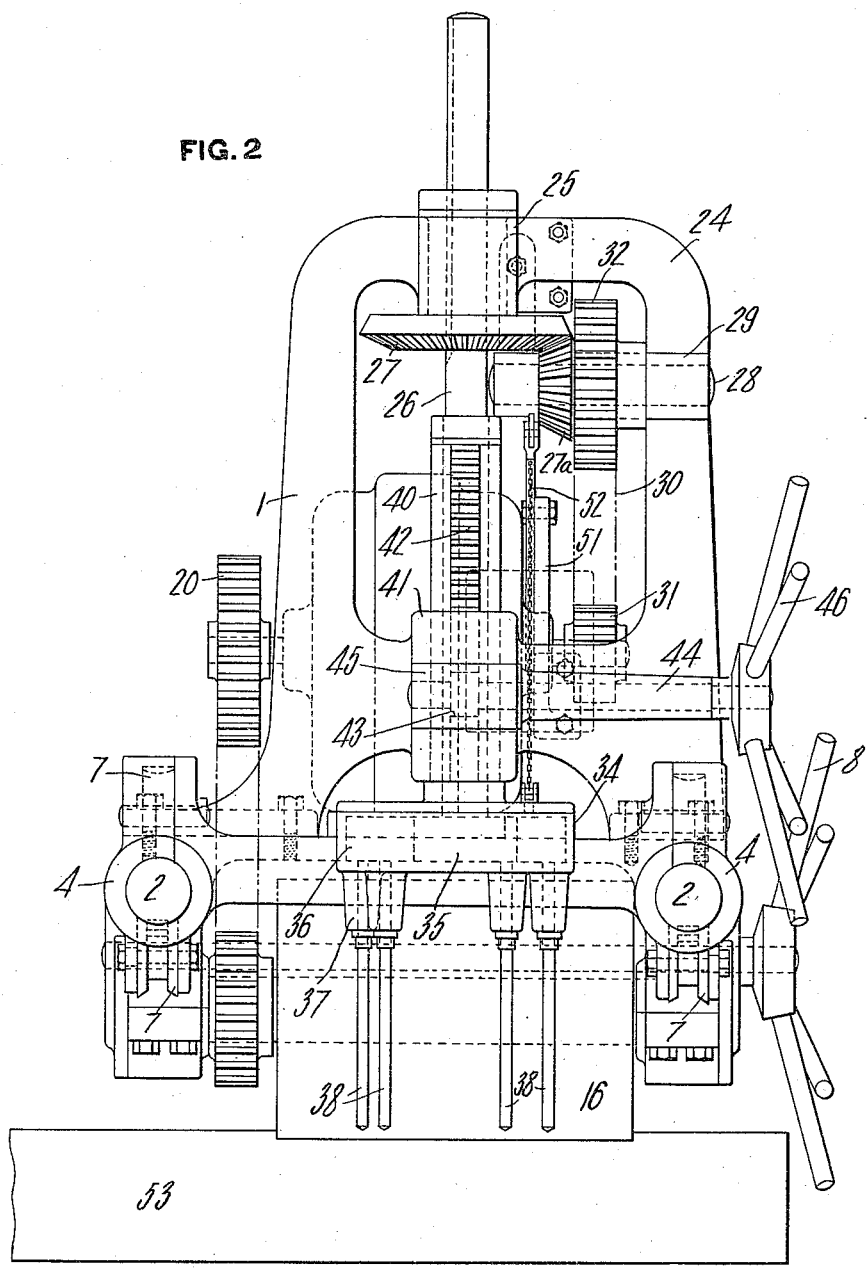

G. B. SHIPLEY.
ADZING AND BORING MACHINE.
APPLICATION FILED JUNE 27, 1914.
1,161,986.
Patented Nov. 30, 1915.
3 SHEETS—SHEET 3.
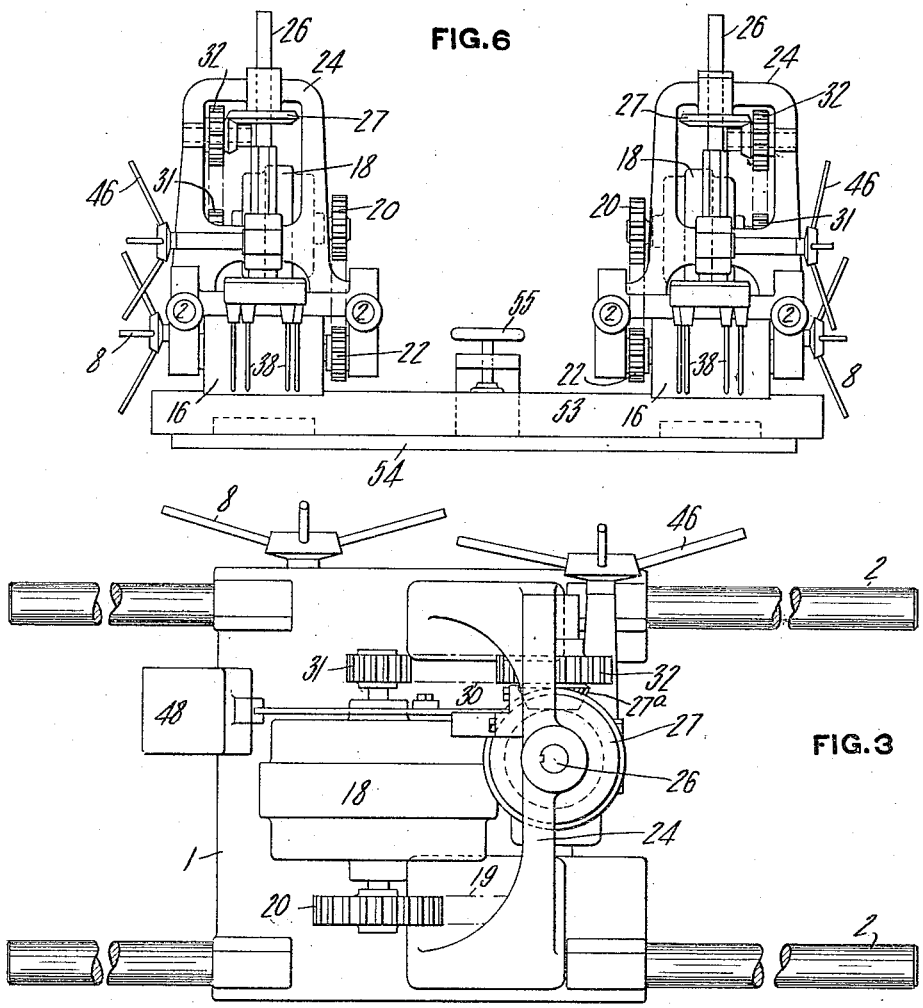
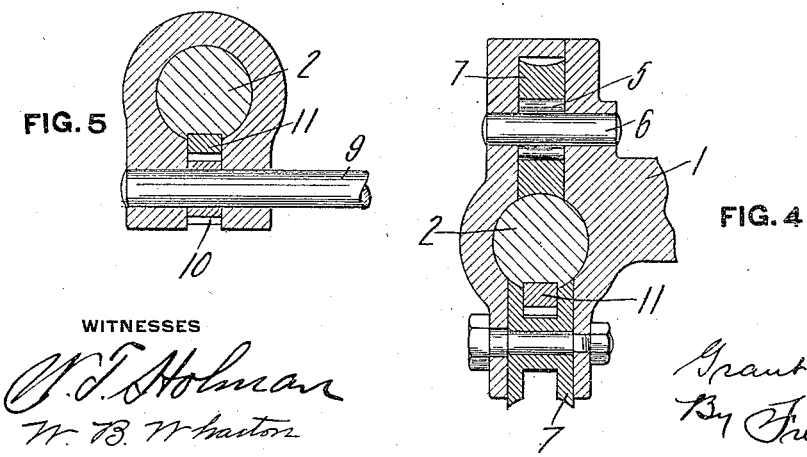
WITNESSES
INVENTOR

UNITED STATES PATENT OFFICE.

GRANT B. SHIPLEY, OF PITTSBURGH, PENNSYLVANIA.

ADZING AND BORING MACHINE.

1,161,986.  Specification of Letters Patent.  Patented Nov. 30, 1915.

Application filed June 27, 1914. Serial No. 847,731.

*To all whom it may concern:*

Be it known that I, GRANT B. SHIPLEY, a resident of Pittsburgh, in the county of Allegheny and State of Pennsylvania, have invented a new and useful Improvement in Adzing and Boring Machines, of which the following is a specification.

This invention relates to a combined adzing and boring machine, and more particularly to a machine of this character for gaining tie plate or rail seats and boring rail-securing spike holes on railroad ties.

The object of the invention is to provide a machine of the character described which will perform the gaining and boring operations on the tie, which is movable horizontally on a support so as to bring the adzing and boring devices successively into action on the tie, which is self-contained, having a source of power mounted directly thereon, for actuating both the adzing and the boring devices, and by means of which the gaining and boring operations are quickly and efficiently performed without the necessity of moving the tie between operations.

The invention comprises the construction and combination of elements hereinafter described and particularly pointed out in the claims.

In the accompanying drawings, Figure 1 is a side elevation of the machine; Fig. 2 is an end elevation thereof; Fig. 3 is a plan view thereof; Figs. 4 and 5 are sectional views taken respectively on the lines 4—4, and 5—5, Fig. 1; and Fig. 6 shows a set of machines in operative position.

The machine comprises a suitable frame 1 upon which the operative and actuating parts are mounted and which frame is longitudinally movable upon suitable tracks or ways in order to bring the adzing and boring heads successively into action on the tie. These tracks or ways are shown as a pair of circular bars or rails 2 supported at their ends by suitable means (not shown) and passing through openings in housings 4 on the main frame, two such housings being located on each side of the machine and respectively at opposite ends thereof. These housings are provided with bearings 5, preferably of the roller or ball type to reduce friction, and in which are mounted the journals 6 of suitable guide and supporting rollers 7 arranged in pairs, the members of each pair bearing respectively on the upper and lower faces of the guide bars or rails 2, and which rollers carry the machine frame back and forth longitudinally on said bars or rails.

For traversing the machine back and forth on the bars or rails I provide a suitable hand wheel 8 connected to a transverse spindle or shaft 9 mounted in suitable bearings depending from the frame 1 and having secured thereto a pair of small gears or pinions 10 meshing with racks 11 formed on or suitably secured to the guide bars or rails 2. Obviously by turning the hand wheel 8 in one direction the machine frame is moved along the ways or tracks 2 in one direction, and turning the hand wheel in the opposite direction reverses the movement of said machine frame.

Mounted in bearings 13, which also preferably are of the roller or ball type to reduce friction, and depending from the side members of the main frame 1, is a transverse shaft 14 which between said bearings carries the adzing head 15, the latter being provided with one or more adzing bits or knives 16. Mounted on the frame 1 is a suitable source of power, shown as an electric motor 18, whose armature is operatively connected to the adzing shaft 14, this connection being shown as a silent chain 19 passing over a gear wheel or sprocket 20 secured to the armature shaft 21 of the motor 18, and over a similar sprocket or wheel 22 secured to the adzing shaft 14.

At one end of the machine frame is the upwardly extending housing 24 of an inverted U-shape, which at its upper end is provided with a bearing 25 in which is rotatably and slidably mounted the vertical boring spindle 26. This spindle is slidable through a bevel gear 27 which has a splined connection with said spindle and which meshes with the bevel pinion 27ᵃ on a short transverse spindle or shaft 28 mounted in bearings 29 carried by the frame 24. The bevel pinion 27ᵃ is driven from the electric motor 18 by any suitable means, the means shown comprising a silent chain 30 connecting a sprocket or wheel 31 on the armature shaft 21 of the motor 18 with a similar wheel or sprocket 32 integral with or secured to the bevel pinion 27ᵃ. Thus both the boring spindle and the adzing head are driven from the same source of power mounted directly on the machine frame and movable therewith.

The lower end of boring spindle 26 extends into the boring head or casing 34, and is provided within said head or casing with a gear 35 meshing with a plurality of gears 36 secured to vertical spindles which project through the head and at their lower ends are provided with sockets or chucks 37 for the boring bits 38. Secured to the casing or head 34 and surrounding the spindle 26 is a sleeve 40 which is vertically slidable through a bearing 41 mounted between the legs of the U-shaped frame 24. On said sleeve 40 is a rack 42 which is engaged by a pinion 43 secured to a transverse shaft 44 mounted in a bearing 45 carried by the frame 24 and which shaft at its outer end carries a hand wheel 46. Obviously, by turning this hand wheel in the proper directions, the sleeve 40, and with it the boring head 34 and boring bits carried thereby, are raised and lowered, the boring spindle 26 sliding through the bearing 25 and gear 27, as is common in boring machines. The boring head 34 and attached parts are partly counterbalanced by a counterweight 48 adjustable on the outer end of a lever 49 fulcrumed at 50 on an arm 51 secured to the frame 24, said lever having its opposite end connected to the boring head 34 by any suitable means, shown as a chain 52, whereby the boring head and attached parts are partly counterbalanced so as to make the work of raising and lowering the same easy.

The ties 53 to be gained and bored are brought underneath the machine on ways or tracks 2 by any suitable mechanical means (not shown) and are supported upon a bearing 54 and held rigidly in position by any clamping means, such as the clamp 55. Preferably two complete boring machines will be mounted side by side (see Fig. 6), one acting upon one end of the tie and the other upon the other end of the tie so that both ends of the tie can be gained and bored substantially simultaneously.

In use the tie is clamped in position as described and then the operator turns the hand wheel 8 in the proper direction to move the machine slowly across the tie and transversely thereto, whereby the adzing head will cut the gain across the upper face of the clamped tie. The operator will continue to move the machine in the direction described until the boring head is brought over the tie. He then actuates hand wheel 46 and lowers the boring head to cause the bits 38 to bore into the tie the desired number of spike or screw receiving holes. He then reverses the operation of hand wheel 46, lifting the boring head and bits until the latter clear the tie. The tie is then unclamped, and removed, the hand wheel 8 turned in the reverse direction to move the machine back to starting position, and a new tie is brought underneath the machine and clamped in position, whereupon the foregoing operations are repeated.

The machine described is entirely self-contained, and occupies a minimum amount of space, with practically a clear space overhead and also underneath so as not to interfere with the movements of the workmen and facilitate the bringing of the ties into position and removing them after being gained and bored. Furthermore, the gaining and boring operations are performed successively upon the tie by the simple expedient of moving the machine transversely of the tie and without the necessity of unclamping the tie and moving the same between operations and again clamping the same for the second operation, thereby greatly facilitating and reducing the labor in handling the timber and also reducing the time necessary to gain and bore the same, as compared to prior machines for doing the same character of work.

Obviously, the machine may be modified within considerable limits without departing from the spirit of the invention, and it will be understood that limitations are not to be imposed upon the claims hereinafter made beyond their express terms.

What I claim is:—

1. In a wood working machine, the combination of a frame comprising side members, a pair of parallel horizontal rails or ways engaged by said frame side members and on which said frame is movable, a horizontal shaft mounted at its ends in the side members of said frame, an adzing head on said shaft between the frame side members, a vertical shaft mounted in said frame between the sides thereof and having vertical movement therein, a boring head carried by said vertical shaft in alinement with said adzing head, and actuating mechanism mounted in said frame and operatively connected to both said horizontal and vertical shafts.

2. In a wood working machine, the combination of a frame comprising side members, a pair of parallel horizontal rails or ways engaged by said frame side members and on which said frame is movable, a horizontal shaft mounted at its ends in the side members of said frame, an adzing head on said shaft between the frame side members, a vertical shaft mounted in said frame between the sides thereof and having vertical movement therein, a boring head carried by said vertical shaft in alinement with said adzing head, actuating mechanism mounted in said frame and operatively connected to both said horizontal and vertical shafts, and a stationary support and clamp for the timber operatively located in the path of movement of said adzing and boring heads.

3. In a wood working machine, the combination of a frame comprising side members, a pair of parallel horizontal rails or ways engaged by said frame side members and on which said frame is movable, a horizontal shaft mounted in said frame, an adzing head on said shaft between said frame side members, a vertical shaft mounted in said frame between the side members thereof and having vertical movement therein, a boring head carried by said vertical shaft in alinement with said adzing head, a motor mounted on said frame, and driving connections between said motor and said horizontal and vertical shafts, said driving connections being located between the two planes of the frame side members.

4. In a wood working machine, the combination of a frame comprising side members, a pair of parallel horizontal rails or ways engaged by said frame side members and on which said frame is movable, a horizontal shaft mounted in said frame, an adzing head on said shaft between said frame side members, a vertical shaft mounted in said frame between the side members thereof and having vertical movement therein, a boring head carried by said vertical shaft in alinement with said adzing head, a motor mounted on said frame, driving connections between said motor and said horizontal and vertical shafts, said driving connections being located between the vertical planes of the frame side members, and a stationary support and clamp for the timber located in the path of movement of the adzing and boring heads.

5. In a wood working machine, the combination of a frame comprising horizontal side portions and a transverse vertical portion, a horizontal track or way on which said frame is horizontally movable, a horizontal shaft mounted at its ends in the frame side portions, an adzing head on said shaft between the frame side portions, a vertical shaft mounted in the vertical frame portion and having vertical movement therein, a boring head carried by said vertical shaft in alinement with said adzing head, and actuating mechanism mounted on the horizontal frame portions and operatively connected to said horizontal and vertical shafts.

6. In a wood working machine, the combination of a frame, an overhead track or way on which said frame is horizontally movable, a horizontal shaft mounted in said frame with its axis normal to the line of movement of said frame, an adzing head carried by said shaft, a vertical shaft mounted in said frame for vertical movement therein, a boring head carried by said vertical shaft in alinement horizontally with said adzing head, a power shaft mounted in said movable frame, driving connections between the same and said horizontal and vertical shafts, and a support and clamp for the timber underneath said way or track.

7. In a wood working machine, the combination of a frame, a track or way on which said frame is horizontally movable, a horizontal shaft mounted in said frame with its axis normal to the line of movement of said frame, an adzing head carried by said shaft, a vertical shaft carrying a boring head in alinement with said adzing head, a vertical sleeve rotatably mounted in the frame and having a splined connection with said shaft, said sleeve being provided with a bevel gear, a horizontal counter-shaft mounted in the frame and carrying a bevel gear meshing with said sleeve bevel gear, a power shaft mounted in said frame, and driving connections between said power shaft and the adzing head shaft and the horizontal counter-shaft respectively.

8. In a wood working machine, the combination of a frame provided on its two sides with parallel housings, parallel horizontal rails or ways extending through said housings, rollers mounted in said housings and engaging said rails or ways, a horizontal transverse shaft mounted in said frame, an adzing head on said shaft and located between said rails or ways, a vertical shaft mounted in said frame and vertically movable therein, a boring head carried by said vertical shaft in alinement with said adzing head, a power shaft mounted on said frame, and driving connections between the same and said horizontal and vertical shafts.

In testimony whereof, I have hereunto set my hand.

GRANT B. SHIPLEY.

Witnesses:
GLENN H. LERESCHE,
WILLIAM B. WHARTON.

Copies of this patent may be obtained for five cents each, by addressing the "Commissioner of Patents, Washington, D. C."